Patented May 15, 1923.

1,455,707

UNITED STATES PATENT OFFICE.

JEAN HENRY BRÉGEAT, OF PARIS, FRANCE, ASSIGNOR TO BREGEAT CORPORATION OF AMERICA, OF WILMINGTON, DELAWARE, A CORPORATION OF DELAWARE.

RECOVERY OF ETHER.

No Drawing.   Application filed August 27, 1921.   Serial No. 495,962.

(GRANTED UNDER THE PROVISIONS OF THE ACT OF MARCH 3, 1921, 41 STAT. L., 1313.)

*To all whom it may concern:*

Be it known that I, JEAN HENRY BRÉGEAT, citizen of the French Republic, residing at Paris, France, have invented certain new and useful Improvements in the Recovery of Ether (for which application was made for a French patent on May 23, 1916, and French Patent 502,882 was granted on March 3, 1920, thereupon and published May 28, 1920); and I do hereby declare the following to be a full, clear, and exact description of the invention, such as will enable others skilled in the art to which it appertains to make and use the same.

The industrial importance of the problem of the recovery of ether is well known, that is to say, the extraction of this product from gaseous mixtures more or less rich in ether.

This problem is met with in the manufacture of artificial silk (Chardonnet) and specially in the manufacture of modern military explosives. In the latter case in particular, the losses of ether attain considerable amounts.

One of the methods which has been proposed for the recovery of the ether consists in absorbing same by more or less concentrated sulphuric acid in suitably disposed apparatus.

Sulphuric acid readily absorbs ether but it is impossible or at least difficult and complicated ultimately to separate the sulphuric acid and the ether from each other.

An idea of this can be obtained from the following fact:

Sulphuric acid at 66° Baumé absorbs more than its own weight of ether but this ether once absorbed it is impossible to distil it by directly heating the sulphuric acid. To obtain it, it is necessary previously to dilute the sulphuric acid with water, but this dilution is inconvenient in that it does not permit the employment of a continuous process since it is necessary to reconcentrate the sulphuric acid before its re-employment; this concentration occasions special difficulties, resulting from the nature of the product which the acid retains in solution. Also the concentration involves considerable expense.

It is further necessary when employing concentrated sulphuric acid to take into account the fact that the acid is constantly being diluted by the water vapour contained in the gas which passes through the apparatus, hence the desirability, if not necessity, of adding absorption apparatus, that is, a desiccating apparatus (cold or chemical desiccation).

In the researches which have led to the present invention an absorbent for ether has been sought responding to the following conditions:—

1. Readily to absorb the ether;
2. To permit an easy regeneration of the ether;
3. To render unnecessary a preliminary drying of the gaseous mixtures charged with the ether;
4. To permit the etherification of the alcohol which always accompanies the ether in these gaseous mixtures.

I have found it possible commercially to realize these conditions by employing, not sulphuric acid, but a sulphonic acid.

Amongst the sulphonic acids, benzene sulphonic acid is mentioned. The manufacture of this acid is very easy, especially if it is considered that the presence of small quantities of sulphuric acid in the benzene sulphonic acid will not be inconvenient in the particular case.

My work has shown that solutions of benzene sulphonic acid absorb ether with the greatest facility and that a moderate heating of the ether solution thus obtained causes the acid to give up the whole of the absorbed ether in a pure state.

Further, the production of ether from alcohol and of benzene sulphonic acid is a well understood reaction.

In view of these facts benzene sulphonic acid can replace with advantage sulphuric acid for the recovery of ether without inconvenience.

For its employment it is sufficient to replace the sulphuric acid by benzene sulphonic acid in existing recovery installations.

Moreover, further experiments have shown that benzene sulphonic acid is not the only substance which may serve as agent for absorbing and then yielding the ether and alcohol contained in gaseous mixtures but that for such purposes more generally the sulphonic acids of the fatty series and the aromatic series may be employed, these sulphonic acids being in more or less concentrated aqueous solutions either alone or mixed in variable proportions with sulphuric acid.

The process of recovery may be effected in any existing appropriate recovery plant whatever.

I claim.

1. A process which comprises bringing a gas containing vapor of ether and alcohol into contact with a sulfonic acid liquid, and thereafter recovering ether from said liquid.

2. A process which comprises bringing a gas containing vapor of ether into contact with a liquid containing an aromatic sulfonic acid as its principal constituent, and thereafter recovering ether from said liquid.

3. A process which comprises bringing a gas containing vapor of ether into contact with a liquid containing benzene sulfonic acid, and thereafter recovering ether from said liquid.

4. A process which comprises bringing a gas containing vapor of ether into contact with a liquid containing an aromatic sulfonic acid together with sulphuric acid, and thereafter recovering ether from said liquid.

5. A process which comprises bringing a gas containing vapor of ether into contact with a liquid containing an aqueous solution of a sulfonic acid, and thereafter recovering ether from said liquid.

6. A process which comprises bringing a gas containing vapor of ether into contact with a sulfonic acid liquid, and thereafter heating the resulting liquid sufficiently to drive off ether in the form of a vapor, and condensing the latter.

7. The process of obtaining ether which comprises utilizing a sulfonic acid to absorb ether from a gaseous element.

In testimony whereof I affix my signature.

JEAN HENRY BRÉGEAT.